(No Model.)
F. C. WEIR.
RAILWAY RAIL JOINT.
No. 294,101. Patented Feb. 26, 1884.
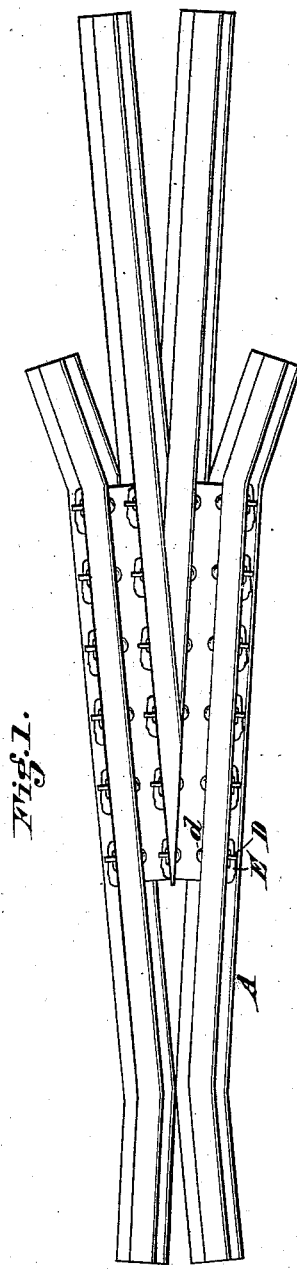
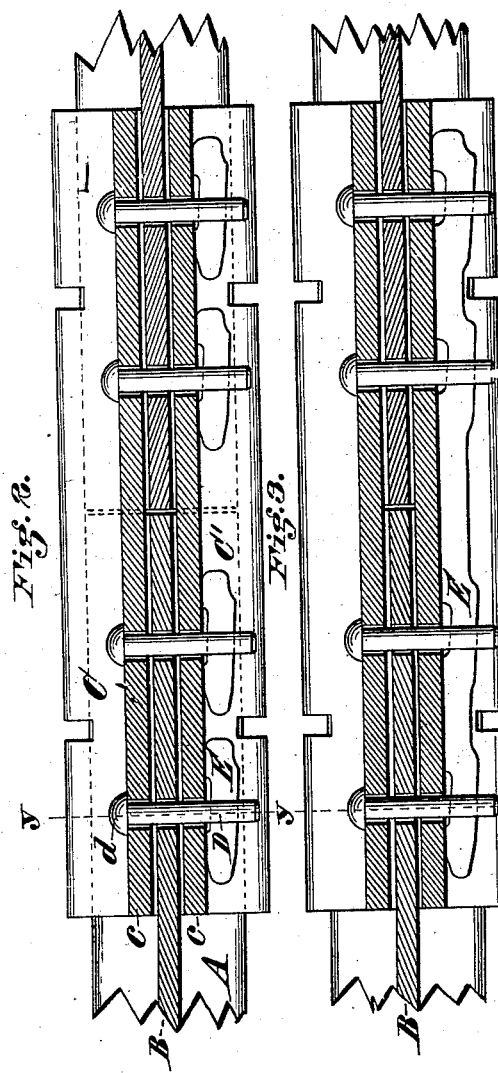
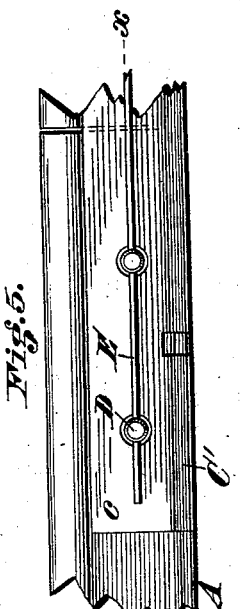
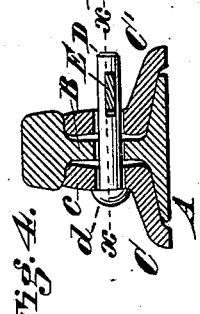
Attest
Jno. E. Jones
A. Gluchowsky
Inventor
Fredric C. Weir,
by Wood & Boyd
his Attorneys

UNITED STATES PATENT OFFICE.

FREDRIC C. WEIR, OF CINCINNATI, OHIO.

RAILWAY-RAIL JOINT.

SPECIFICATION forming part of Letters Patent No. 294,101, dated February 26, 1884.

Application filed February 12, 1883. (No model.)

*To all whom it may concern:*

Be it known that I, FREDRIC C. WEIR, a citizen of the United States, residing at Cincinnati, in the county of Hamilton and State of Ohio, have invented certain new and useful Improvements in Railway-Rail Joints, of which the following is a specification.

My invention relates to an improvement in railway-rail joints, and it is adapted to be used with ordinary fish-plates and with my improved U-shaped channel-irons for uniting the rails, forming railway-frogs or other frogs, when the bolts pass through the webs of the rails, as shown and claimed in Reissued Letters Patent No. 8,914, granted me September 30, 1879.

The object of my invention is to provide ready and reliable means for fastening the bolts passing through the wings of the channel-irons, or of fish-plates, and at the same time allowing the bolts to be removed in case any of the parts should require repair or renewal. It is difficult to rivet the bolts in position, and when riveted they are very difficult to remove. When nuts are used to secure the bolts, they are apt to become loose and weaken the frog or joint, and render the road liable to accidents. My improvement overcomes these various difficulties.

Figure 1 is a plan view of my improvement applied to railway-frogs. Fig. 2 is a sectional plan on line $x$ $x$, Figs. 4 and 5, showing my improvement applied to form the ordinary rail-joint. Fig. 3 is a modified form of making my improved key. Fig. 4 is a section on line $y$ $y$, Fig. 2, and Fig. 5 is a side elevation of the modification shown in Fig. 3.

A represents the flanges of an ordinary T-rail; B, the web; C C', the flanges of fish-plates; and $c$ $c$ represent the webs or wings of the fish-plates.

D D D represent bolts, which have heads $d$ at one end, the opposite end being slotted to receive a taper key.

E represents the elastic taper key or wedge. It is made of tempered steel and notched out on the inner edge opposite the bolt, so as to form bearing-points upon each side of the bolt, and the cutting away of the metal between these points is very essential to prevent the key from working loose. It also materially lessens the liability of the slotted bolt loosening from contraction and expansion of the metals, and makes a very effective means for securing the bolt and producing a reliable joint. It can be readily driven in and secured in place, and it is not liable to become loose, but requires firm, hard driving to remove the key when once secured in position.

Taper keys having the abutting edge plane abutting against the fish-plate, and nuts or even rivets to secure the fish-plate to form rail-joints are all liable to work loose under the attrition of the parts caused by the shock of the train. The use of my elastic notched key overcomes this tendency to loosen.

I deem the long taper and spring key shown in Fig. 3 as the equivalent of those shown in Fig. 2. One, two, or four taper keys may be used to form the rail-joint, as desired.

I am aware that heretofore the two securing-bolts of a rail-fastening have been locked by a single bow-shaped key passed through the slotted ends of said two bolts, as shown in the patent to Collingworth, No. 229,522, of July 6, 1880; but the construction of said key is different from mine, in that it is not at all adapted to the locking of a single individual bolt, but is confined to the locking of two bolts at least; and I lay no claim to it.

I claim—

The combination, with the rail and the fish-plates, of the headed and slotted bolts passing through the web of the rail, and the fish-plates and the elastic keys having their inner bearing portions straight and their outer edges tapered and notched out or cut away on their inner edges opposite to the bolts, so as to form bearings on either side of each bolt, substantially as described.

In testimony whereof I have hereunto set my hand in the presence of two subscribing witnesses.

FREDRIC C. WEIR.

Witnesses:
JNO. E. JONES,
FRANK MILLWARD.